United States Patent
Yazawa et al.

(10) Patent No.: US 7,486,477 B2
(45) Date of Patent: Feb. 3, 2009

(54) FECONI SOFT MAGNETIC FILM INCLUDING A CONTROLLED RATIO OF CHLORINE AND SULFUR

(75) Inventors: Hisayuki Yazawa, Niigata-ken (JP); Shio Takahashi, Niigata-ken (JP)

(73) Assignee: TDK Corporation, Tokyo (JP)

( * ) Notice: Subject to any disclaimer, the term of this patent is extended or adjusted under 35 U.S.C. 154(b) by 380 days.

(21) Appl. No.: 11/339,366

(22) Filed: Jan. 25, 2006

(65) Prior Publication Data
US 2006/0171071 A1   Aug. 3, 2006

(30) Foreign Application Priority Data
Jan. 31, 2005   (JP)   ............................... 2005-022454

(51) Int. Cl.
*G11B 5/127* (2006.01)
(52) U.S. Cl. .............................. 360/125.03; 360/125.16; 360/125.41; 360/125.54
(58) Field of Classification Search ............. 360/125.03, 360/125.16, 125.41, 125.54
See application file for complete search history.

(56) References Cited

U.S. PATENT DOCUMENTS

| | | | | |
|---|---|---|---|---|
| 5,091,225 A | * | 2/1992 | Goto | ........................ 427/430.1 |
| 5,354,421 A | * | 10/1994 | Tatsumi et al. | .............. 438/695 |
| 6,090,498 A | * | 7/2000 | Omata et al. | .............. 428/811.2 |
| 6,195,239 B1 | * | 2/2001 | Araki et al. | ............. 360/324.11 |
| 7,023,658 B1 | * | 4/2006 | Knapp et al. | ........... 360/125.56 |
| 7,288,333 B2 | * | 10/2007 | Kawasaki et al. | ........... 428/812 |
| 2004/0053077 A1 | | 3/2004 | Kawasaki et al. | |
| 2005/0141147 A1 | * | 6/2005 | Sbiaa et al. | .............. 360/324.2 |

FOREIGN PATENT DOCUMENTS

JP      11-86217         3/1999
JP      2000164418 A  *  6/2000

* cited by examiner

*Primary Examiner*—Jefferson Evans
(74) *Attorney, Agent, or Firm*—Brinks Hofer Gilson & Lione (57) ABSTRACT

A soft magnetic film is formed of a CoFeNi alloy containing trace amounts of chlorine and sulfur as impurities. The stress of the soft magnetic film can be reduced effectively, specifically to 1,200 MPa or less, by adjusting the concentration ratio of chlorine to sulfur within the range from 1 to 60. In addition, variations in film stress can be reduced to provide higher yields of CoFeNi alloy films with low stresses.

3 Claims, 5 Drawing Sheets

FECONI SOFT MAGNETIC FILM INCLUDING A CONTROLLED RATIO OF CHLORINE AND SULFUR

BACKGROUND OF THE INVENTION

1. Field of the Invention

The present invention relates to soft magnetic films for applications such as main pole layers in perpendicular magnetic recording heads, and particularly to a soft magnetic film formed of a CoFeNi alloy with reduced film stress and a magnetic head including the soft magnetic film.

2. Description of the Related Art

Soft magnetic films for applications such as main pole layers in perpendicular magnetic recording heads are required to have high saturation flux densities. Among such soft magnetic films with high saturation flux densities are CoFeNi alloy films, which have higher saturation flux densities than, for example, NiFe alloy films.

For example, U.S. Patent Application Publication No. 2004/0053077 A1 (Patent Document 1) discloses an invention related to CoFe alloy (no description for CoFeNi alloy). According to Patent Document 1, saccharin sodium, which is generally added to a plating bath, is not added so that the saturation flux density of CoFe alloy can be increased. Saccharin sodium is used to reduce film stress; if saccharin sodium is not added to a plating bath, the resultant film poses problems such as increased stress.

The problem of increased stress results similarly for plating with CoFeNi alloy in a plating bath containing no saccharin sodium.

Japanese Unexamined Patent Application Publication No. 11-86217 (the English translation of Patent Abstracts of Japan (PAJ); Patent Document 2) is intended to produce a magnetic film having higher high-frequency characteristics by adding thiourea to a plating bath so that the magnetic film can contain sulfur to achieve higher resistivity. Patent Document 2, however, makes no mention of the stress of a soft magnetic film, and the addition of sulfur cannot be expected to provide higher saturation flux densities and corrosion resistance.

As described above, minimizing the sulfur content of a soft magnetic film can be expected to provide, for example, higher saturation flux densities and corrosion resistance though the minimized sulfur content also causes the problem of increased film stress. Such increased film stress is undesirable because, for example, the soft magnetic film peels off more readily.

It is known that a soft magnetic film contains impurity elements. The impurity elements are believed to have no significant effect on the soft magnetic characteristics of the film because the impurity elements are contained in trace amounts (for example, at the ppm level); conventionally, the concentration ratios of the impurity elements are not controlled.

Table 1 of Patent Document 1, for example, discloses the compositions, saturation flux densities, film stresses, etc. of CoFe alloys in Examples 1 and 2. The CoFe alloys of Examples 1 and 2 have high saturation flux densities, but exhibit significant variations in film stress; particularly, some of them have film stresses exceeding 1,200 MPa. Such variations in film stress are also found among soft magnetic films having similar Co and Fe contents.

SUMMARY OF THE INVENTION

Accordingly, an object of the present invention, which has been created to solve the above problems, is to provide a soft magnetic film formed of a CoFeNi alloy having an impurity concentration ratio adjusted so as to reduce the stress of the film, and also to provide a magnetic head including the soft magnetic film.

The present invention provides a soft magnetic film mainly containing Fe, Co, and Ni. This soft magnetic film further contains chlorine (Cl) and sulfur (S) as impurities at a concentration ratio (Cl/S) ranging from 1 to 60.

According to the present invention, the soft magnetic film is formed of a CoFeNi alloy containing trace amounts of chlorine and sulfur as impurities. The stress of the soft magnetic film can be reduced effectively, specifically to 1,200 MPa or less, by adjusting the concentration ratio of chlorine to sulfur within the above range, namely from 1 to 60. In addition, variations in film stress can be reduced to provide higher yields of CoFeNi alloy films with low stresses.

The present invention further provides a magnetic head including a main pole layer, a return path layer separated from the main pole layer by a predetermined distance in the thickness direction of the layers on a surface of the magnetic head opposite a recording medium, and a coil layer for supplying a recording magnetic field to the main pole layer and the return path layer. The main pole layer and/or the return path layer is formed of the soft magnetic film described above.

The present invention further provides a magnetic head including a lower core layer, an upper core layer, and a magnetic pole portion disposed therebetween. The magnetic pole portion has a smaller width than the core layers in a track-width direction. The magnetic pole portion includes a lower pole layer continuous with the lower core layer, an upper pole layer continuous with the upper core layer, and a gap layer disposed between the pole layers. Alternatively, the magnetic pole portion includes an upper pole layer continuous with the upper core layer and a gap layer disposed between the upper pole layer and the lower core layer. The upper pole layer and/or the lower pole layer is formed of the soft magnetic film described above.

Using the CoFeNi alloy according to the present invention, the main pole layer, for example, can provide a high saturation flux density, excellent corrosion resistance, and low film stress. A magnetic head including such a layer can be suitably used for higher recording densities and has excellent durability without causing defects such as film peeling.

DESCRIPTION OF THE PREFERRED EMBODIMENTS

Figure 1:
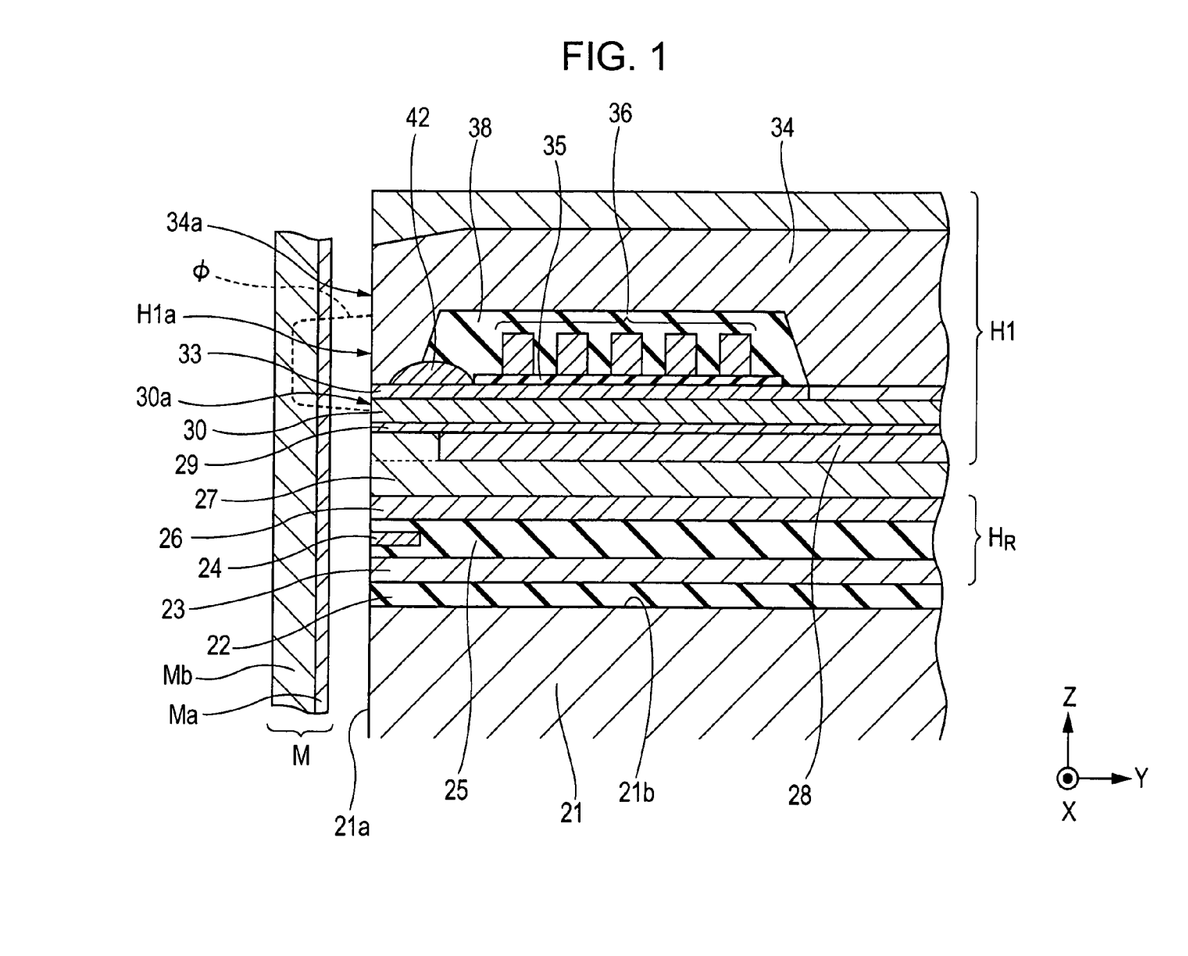
FIG. 1 is a partial longitudinal sectional view of a magnetic head according to an embodiment of the present invention.

FIG. 1 is a partial longitudinal sectional view of a perpendicular magnetic recording head according to an embodiment of the present invention. In FIG. 1, a perpendicular magnetic recording head H1 supplies a perpendicular magnetic field to a recording medium M to magnetize a hard film Ma of the recording medium M in the perpendicular direction.

The recording medium M is, for example, disc-shaped and is rotated about the center of the disc. The recording medium M has the hard film Ma outside, which has high coercivity, and a soft film Mb having high permeability inside.

A slider 21 is formed of a nonmagnetic material such as $Al_2O_3$.TiC and has a surface 21a opposite the recording medium M. The recording medium M rotates to cause a surface airflow which allows the slider 21 to float or slide over the surface of the recording medium M.

A nonmagnetic insulating layer 22 is formed of an inorganic material such as $Al_2O_3$ or $SiO_2$ on the trailing end surface 21b of the slider 21. A read portion $H_R$ is provided on the nonmagnetic insulating layer 22.

The read portion $H_R$ includes a lower shield layer 23, an upper shield layer 26, an inorganic insulating layer (gap insulating layer) 25 disposed between the shield layers 23 and 26, and a read element 24 disposed in the inorganic insulating layer 25. The read element 24 exploits a magnetoresistance effect such as anisotropic magnetoresistance (AMR), giant magnetoresistance (GMR), or tunneling magnetoresistance (TMR).

A separating layer 27 is formed of an inorganic material such as $Al_2O_3$ or $SiO_2$ on the read portion $H_R$, and the perpendicular magnetic recording head H1 is provided on the separating layer 27. A surface H1a of the magnetic head H1 opposite the recording medium M is substantially flush with the surface 21a of the slider 21 opposite the recording medium M.

The magnetic recording head H1 alone may also be mounted on the trailing end surface 21b of the slider 21 without providing the read portion HR.

The magnetic recording head H1 includes a yoke layer 28 formed by plating with a ferromagnetic material such as permalloy (Ni—Fe). The yoke layer 28 is buried in the separating layer 27 and is not exposed on the surface H1a of the magnetic head H1 opposite the recording medium M.

A seed layer 29, for example a conductive metal film such as a NiFe film, is deposited on the top surface of the yoke layer 28 by sputtering.

In the embodiment shown in FIG. 1, a main pole layer 30 is formed on the seed layer 29 by plating with a CoFeNi alloy.

A gap layer 33 is formed of a nonmagnetic material on the main pole layer 30. A coil layer 36 is formed on the gap layer 33 with an underlying coil-insulating layer 35 disposed therebetween. A gap-depth-defining layer 42 is formed on the gap layer 33 to define a gap depth. The coil layer 36 is covered with a coil-insulating layer 38 formed of, for example, resist.

A return path layer 34 extends from the top rear of the main pole layer 30 to the surface H1a opposite the recording medium M. The return path layer 34 and the main pole layer 30 are separated from each other by a predetermined distance in the film-thickness direction (in the Z direction in the drawing) with the gap layer 33 disposed therebetween on the surface H1a opposite the recording medium M.

The front end surface 30a of the main pole layer 30 opposite the recording medium M has a sufficiently smaller area than the front end surface 34a of the return path layer 34 opposite the recording medium M. The coil layer 36 is supplied with a recording current which induces a recording magnetic field in the return path layer 34, the yoke layer 28, and the main pole layer 30. The flux φ of a leakage recording magnetic field then concentrates on the front end surface 30a of the main pole layer 30 to magnetize the hard film Ma in the perpendicular direction, thereby recording magnetic data.

The CoFeNi alloy used for the main pole layer 30 in FIG. 1 contains chlorine (Cl) and sulfur (S) as impurities. The concentration ratio of Cl to S (Cl/S) is adjusted so as to range from 1 to 60.

Because the main pole layer 30 contains Cl and S in trace amounts (at the ppm level), the concentration ratio may be determined by time-of-flight secondary ion mass spectrometry (TOF-SIMS). The numbers of Cl ions and S ions can be counted by TOF-SIMS, and the concentration ratio is determined by dividing the number of Cl ions by that of S ions. The concentration ratio Cl/S may be adjusted to 1 to 60 to lower the film stress of the main pole layer 30 to 1,200 MPa or less, may be adjusted to 40 or less to lower the film stress to 1,000 MPa or less, or may be adjusted to 10 or less to lower the film stress to 800 MPa or less.

The film stress can thus be lowered by reducing the concentration ratio Cl/S. In particular, variations in film stress can be reduced by adjusting the concentration ratio Cl/S within the above range not only for films containing substantially the same amounts of magnetic elements, namely Co, Fe, and Ni, but also for films containing slightly different amounts of magnetic elements (variations in Fe content of about 15% by mass in the experiments described below).

The content of Fe preferably ranges from 65% to 95% by mass. The content of Ni preferably ranges from 5% to 25% by mass. The content of Co preferably ranges from 2% to 25% by mass. Such a composition provides a high saturation flux density, namely 2 T or more. The sum of the Fe, Ni, and Co contents is 100% by mass. In the strict sense, the sum does not equal 100% by mass because the CoFeNi alloy also contains impurity elements. The contents of such impurity elements, however, are extremely low and thus cannot be measured by, for example, energy-dispersive X-ray spectrometry (EDS). In the present invention, therefore, the sum of the Fe, Co, and Ni contents is assumed to be 100% by mass, and the concentration ratio Cl/S is determined by TOF-SIMS above. More preferably, the Ni content ranges from 10% to 18% by mass to achieve high saturation flux density and inhibit coercivity Hc, specifically to 3 Oe (about 237 A/m) or less.

For substantially the same concentration ratio Cl/S, less variations in film stress result irrespective of variations in Fe content within the above range; the magnitude of film stress depends largely on the concentration ratio Cl/S.

A method for producing the CoFeNi alloy used in the present invention is described below. Saccharin sodium ($C_6H_4CONNaSO_2$) is not added to the plating bath used in the present invention. For example, $FeSO_4.7H_2O$, $CoSO_4.7H_2O$, $NiSO_4.6H_2O$, $H_3BO_3$, and NaCl are added to the plating bath. The amounts of the metal salts added are adjusted so that the total metal ion concentration of Fe ions, Ni ions, and Co ions in the plating bath ranges approximately from 1.75 to 5.0 g/l.

The CoFeNi alloy is produced by electroplating with pulsed current. The density of the pulsed current is adjusted within the range of about 10 to 27 mA/cm$^2$.

The concentration ratio Cl/S varies with the metal ion concentration and the current density according to the experiments described below. In the present invention, therefore, the metal ion concentration and the current density are suitably adjusted so that the concentration ratio Cl/S ranges from 1 to 60.

The CoFeNi alloy, which contains Cl and S as impurities at a concentration ratio (Cl/S) ranging from 1 to 60, may also be used for the return path layer 34; the CoFeNi alloy is used for at least one of the main pole layer 30 and the return path layer 34.

Use of the CoFeNi alloy can increase the saturation flux density of the main pole layer 30 and/or the return path layer 34, reduce the stress thereof, and provide excellent corrosion resistance. Specifically, saturation flux densities of 2.0 T or more and film stresses of 1,200 MPa or less can be achieved.

The CoFeNi alloy in the present invention may also be used for magnetic layers in magnetic heads other than perpendicular magnetic recording heads. For example, the CoFeNi alloy may be used for a magnetic head shown in FIG. 2.

Figure 2:
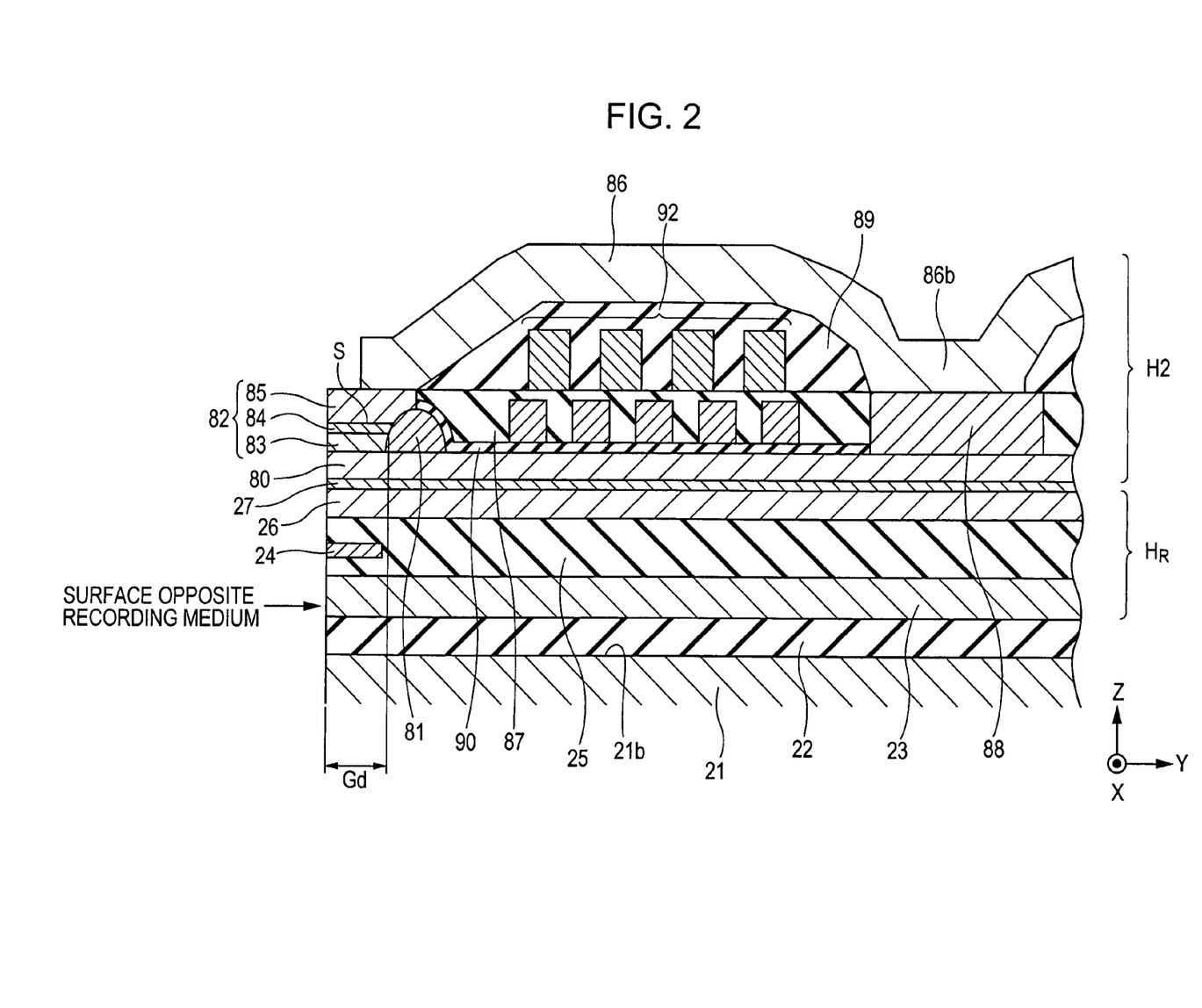
FIG. 2 is a partial longitudinal sectional view of a magnetic head according to another embodiment of the present invention.

A lower core layer 80 of an inductive head H2 is formed on an upper shield layer 26 with a separating layer 27 formed of, for example, $Al_2O_3$ disposed therebetween. The lower core layer 80 is formed of, for example, NiFe. A gap-depth-defining layer 81 is formed of, for example, an insulating material on the lower core layer 80.

A magnetic pole portion 82 extends from the surface opposite a recording medium to the top of the gap-depth-defining layer 81. The magnetic pole portion 82 has a smaller width than the lower core layer 80 and an upper core layer 86 in a track-width direction (in the X direction in the drawing).

The magnetic pole portion 82 includes, from bottom to top, a lower pole layer 83, a nonmagnetic gap layer 84, and an upper pole layer 85.

The lower pole layer 83 is formed on the lower core layer 80 by plating. The gap layer 84, which is disposed on the lower pole layer 83, is preferably formed of a nonmagnetic metal that can be used for plating. Specifically, the metal used is preferably at least one metal selected from the group consisting of NiP, NiPRe, NiPd, NiW, NiMo, Au, Pt, Rh, Pd, Ru, and Cr. If the gap layer 84 is formed of such a nonmagnetic metal that can be used for plating, the lower pole layer 83, the gap layer 84, and the upper pole layer 85 can be continuously formed by plating.

The gap layer 84 is formed of NiP in this embodiment because the use of NiP provides a suitable nonmagnetic state of the gap layer 84.

The upper pole layer 85, which is disposed on the gap layer 84, is magnetically connected to the upper core layer 86, which is disposed on the upper pole layer 85.

The gap depth is defined by the length of the interface S between the upper pole layer 85 and the gap layer 84 in a height direction (the length of the interface S from the surface opposite a recording medium to the gap-depth-defining layer 81).

In FIG. 2, a coil layer 92 having a bilayer structure is formed on an underlying insulating layer 90 by patterning and is covered with insulating layers 87 and 89.

The upper core layer 86 is formed by frame plating, extending over the insulating layer 89 from the top of the magnetic pole portion 82.

A base portion 86b of the upper core layer 86 is connected to a connection layer (back gap layer) 88 formed of a magnetic material such as NiFe on the lower core layer 80.

The magnetic pole portion 82 has the same width as a track width Tw in the track-width direction (in the X direction in the drawing).

The magnetic head shown in FIG. 2 is a longitudinal magnetic recording head. The CoFeNi alloy according to the present invention is used for, for example, the upper pole layer 85 to increase the saturation flux density and corrosion resistance of the upper pole layer 85 and reduce the stress thereof. Specifically, saturation flux densities of 2.0 T or more and film stresses of 1,200 MPa or less can be achieved.

The CoFeNi alloy may also be used for the lower pole layer 83. In this embodiment, the CoFeNi alloy is used for at least one of the pole layers 85 and 83. In addition, the magnetic pole portion 82 may also have a bilayer structure including the gap layer 84 and the upper pole layer 85.

EXAMPLES

An experiment was conducted using the following plating baths having different compositions.

[Plating Bath 1]
$FeSO_4.7H_2O$: 11.0 to 13.0 g/l
$CoSO_4.7H_2O$: 0.6 g/l
$NiSO_4.6H_2O$: 10 g/l
$H_3BO_3$: 25 g/l
NaCl: 25 g/l
Malonic acid: 0.01 g/l
Sodium lauryl sulfate: 0.01 g/l

[Plating Bath 2]
$FeSO_4.7H_2O$: 6.5 to 8.5 g/l
$CoSO_4.7H_2O$: 0.3 g/l
$NiSO_4.6H_2O$: 3.5 g/l
$H_3BO_3$: 25 g/l
NaCl: 25 g/l
Malonic acid: 0.005 g/l
Sodium lauryl sulfate: 0.01 g/l The above plating baths 1 and 2 were used to produce five CoFeNi alloys by plating at varying pulsed current densities. Of the five CoFeNi alloys, three CoFeNi alloys were produced using the plating bath 1, and the other two were produced using the plating bath 2.

[Three CoFeNi Alloys Produced Using Plating Bath 1]

CoFeNi Alloy (1)

The density of the pulsed current applied was 17.1 mA/cm$^2$. The concentrations of Fe ions, Co ions, and Ni ions in the plating bath were 2.21 g/l, 0.13 g/l, and 2.23 g/l, respectively, and the sum of these metal ion concentrations was 4.57 g/l. The resultant plating contained 80.4% by mass of Fe, 5.8% by mass of Co, and 13.8% by mass of Ni.

CoFeNi Alloy (2)

The density of the pulsed current applied was 26.3 mA/cm$^2$. The concentrations of Fe ions, Co ions, and Ni ions in the plating bath were 2.21 g/l, 0.13 g/l, and 2.23 g/l, respectively, and the sum of these metal ion concentrations was 4.57 g/l. The resultant plating contained 80.5% by mass of Fe, 5.5% by mass of Co, and 14.0% by mass of Ni.

CoFeNi Alloy (3)

The density of the pulsed current applied was 10.5 mA/cm$^2$. The concentrations of Fe ions, Co ions, and Ni ions in the plating bath were 2.61 g/l, 0.13 g/l, and 2.23 g/l, respectively, and the sum of these metal ion concentrations was 4.97 g/l. The resultant plating contained 80.6% by mass of Fe, 5.8% by mass of Co, and 13.6% by mass of Ni.

[Two CoFeNi Alloys Produced Using Plating Bath 2]

CoFeNi Alloy (4)

The density of the pulsed current applied was 10.5 mA/cm$^2$. The concentrations of Fe ions, Co ions, and Ni ions in the plating bath were 1.61 g/l, 0.06 g/l, and 0.78 g/l, respectively, and the sum of these metal ion concentrations was 2.45 g/l. The resultant plating contained 80.6% by mass of Fe, 6.5% by mass of Co, and 12.9% by mass of Ni.

CoFeNi Alloy (5)

The density of the pulsed current applied was 17.1 mA/cm$^2$. The concentrations of Fe ions, Co ions, and Ni ions in the plating bath were 1.31 g/l, 0.06 g/l, and 0.78 g/l, respectively, and the sum of these metal ion concentrations was 2.15 g/l. The resultant plating contained 80.1% by mass of Fe, 5.2% by mass of Co, and 14.7% by mass of Ni.

Figure 3:
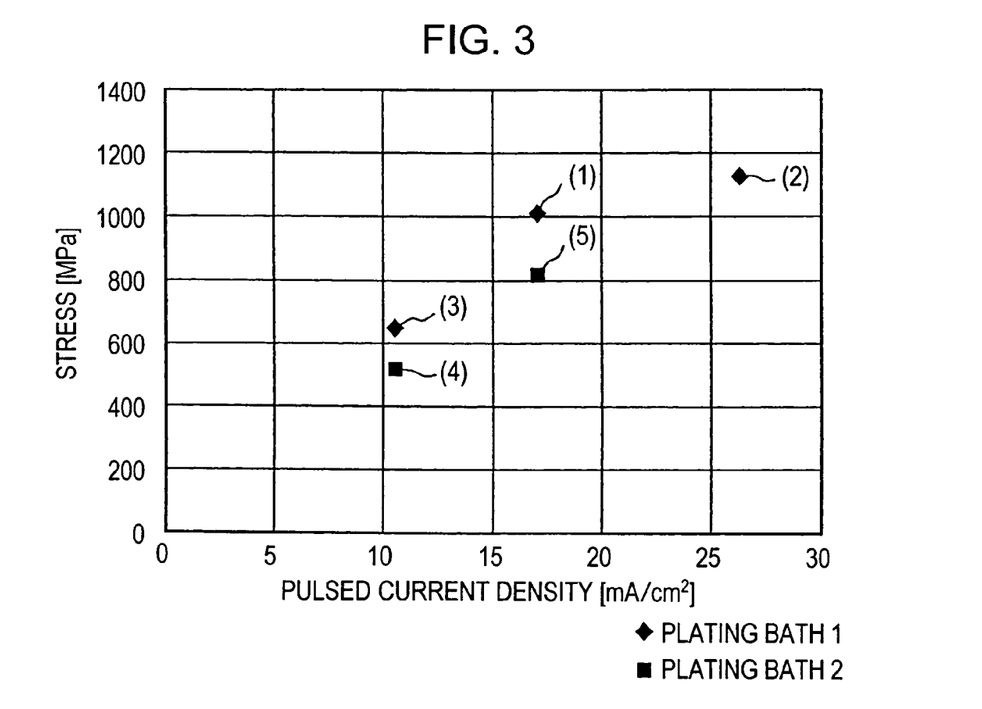
FIG. 3 is a graph showing the relationship between the pulsed current densities used in the formation of five CoFeNi alloys by plating in plating baths having different compositions and the film stresses of the resultant CoFeNi alloys.

The film stresses of the above five CoFeNi alloys were measured. FIG. 3 shows the relationship between the pulsed current densities in the formation of the CoFeNi alloys by plating and the film stresses of the CoFeNi alloys.

FIG. 3 shows that the film stresses of the CoFeNi alloys decreased with decreasing pulsed current densities, and the CoFeNi alloys produced using the plating bath 2 had smaller film stresses than those produced using the plating bath 1. As described above, the metal ion concentration of the plating bath used in the formation of the CoFeNi alloys (4) and (5) was lower than that of the plating bath used in the formation of the CoFeNi alloys (1) to (3). Accordingly, the use of a plating bath having a lower metal ion concentration can be thought to result in a smaller film stress.

Next, the numbers of Cl ions and S ions contained as impurities in the above five CoFeNi alloys were measured by TOF-SIMS, and the number of Cl ions was divided by that of S ions to determine the concentration ratio Cl/S.

Figure 4:
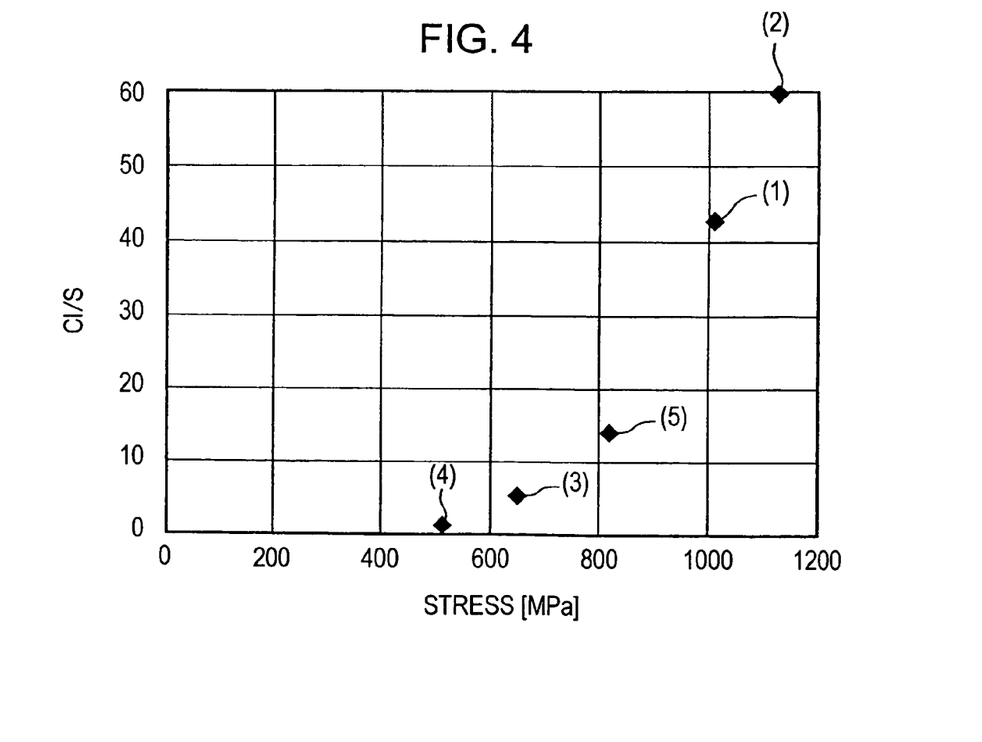
FIG. 4 is a graph showing the relationship between the film stresses of the five CoFeNi alloys and the concentration ratios Cl/S measured by TOF-SIMS.

FIG. 4 is a graph showing the relationship between the film stresses and concentration ratios Cl/S of the CoFeNi alloys (1) to (5).

Figure 5:
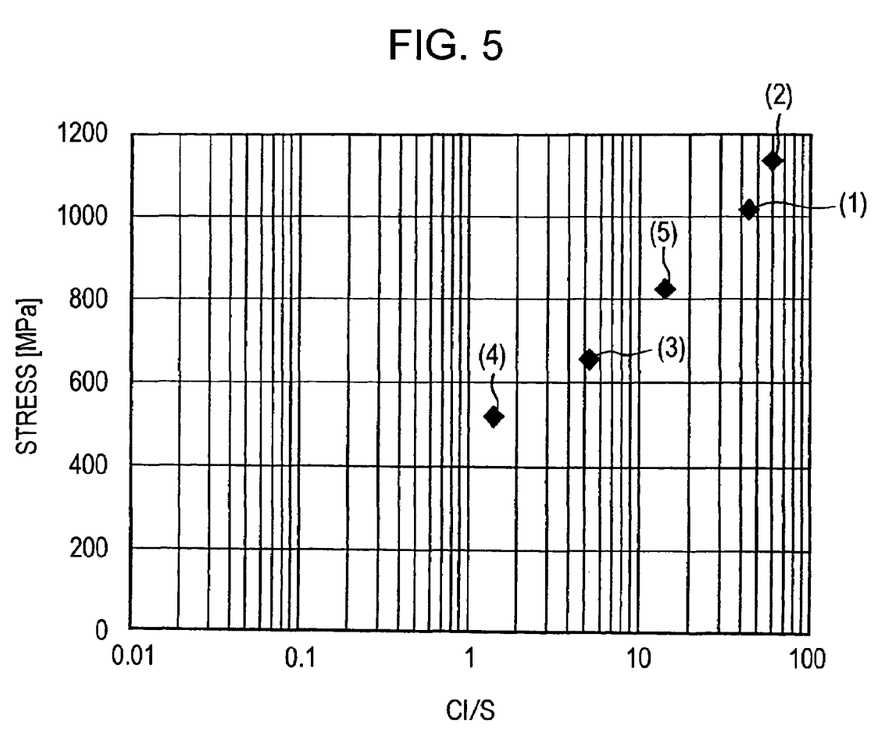
FIG. 5 is a logarithmic graph corresponding to the graph shown in FIG. 4, wherein the horizontal axis indicates the concentration ratios Cl/S; and the vertical axis indicates the film stresses.

FIG. 4 shows that lower concentration ratios Cl/S resulted in smaller film stresses. The results shown in FIGS. 3 and 4 indicate that lower pulsed current densities result in lower concentration ratios Cl/S. FIG. 5 is a logarithmic graph based on the results shown in FIG. 4, wherein the horizontal axis indicates the concentration ratios Cl/S; and the vertical axis indicates the film stresses. The results shown in FIGS. 4 and 5 found that the film stress can be reduced to 1,200 MPa or less by adjusting the concentration ratio Cl/S within the range of 1 to 60.

Next, CoFeNi alloys having different Fe contents were produced by applying a pulsed current in plating baths having a fixed Ni ion concentration of 0.78 g/l and varying combined concentrations of Fe ions and Co ions within the range of 1.75 to 2.85 g/l. The experiment was conducted at pulsed current densities of 10.5 and 17.1 mA/cm$^2$. The results are shown in FIG. 6.

Figure 6:
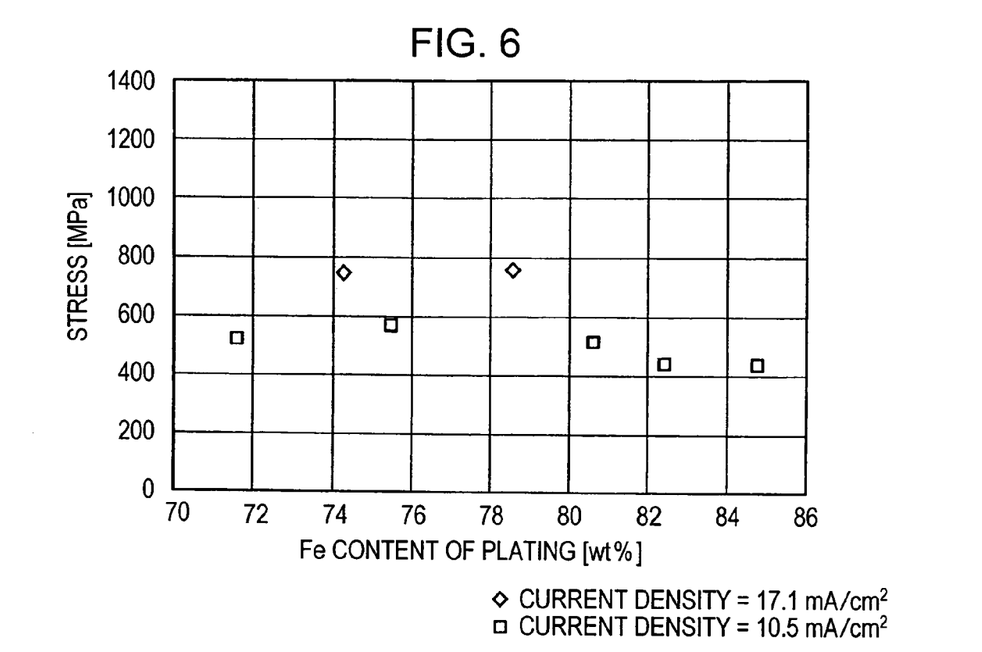
FIG. 6 is a graph showing the relationship between the Fe contents and film stresses of CoFeNi alloys produced by applying a pulsed current at pulsed current densities of 10.5 and 17.1 mA/cm$^2$ in plating baths having a fixed Ni ion concentration of 0.78 g/l and varying combined concentrations of Fe ions and Co ions within the range of 1.75 to 2.85 g/l.

FIG. 6 shows that the film stresses were smaller for a pulsed current density of 10.5 mA/cm$^2$ than for a pulsed current density of 17.1 mA/cm$^2$. The CoFeNi alloys produced by plating at a pulsed current density of 10.5 mA/cm$^2$ had a concentration ratio Cl/S of about 1.1, and the CoFeNi alloys produced by plating at a pulsed current density of 17.1 mA/cm$^2$ had a concentration ratio Cl/S of about 8.8. The results also show that variations in film stress can be inhibited irrespective of variations in Fe content for substantially the same concentration ratio Cl/S. In addition, the CoFeNi alloys produced in the experiment of FIG. 6 exhibited high saturation flux densities, namely not less than 2.0 T.

Next, CoFeNi alloys having different Fe contents were produced by applying a pulsed current in plating baths having a fixed Ni ion concentration of 2.23 g/l and varying combined concentrations of Fe ions and Co ions within the range of 3.60 to 4.97 g/l. The experiment was conducted at pulsed current densities of 10.5 and 26.3 mA/cm$^2$. The results are shown in FIG. 7.

Figure 7:
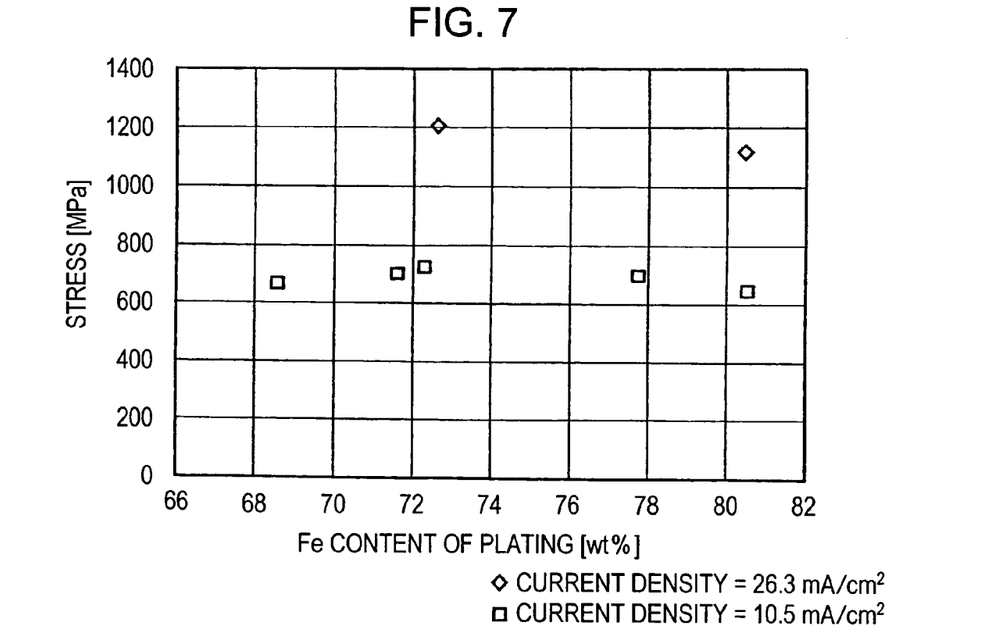
FIG. 7 is a graph showing the relationship between the Fe contents and film stresses of CoFeNi alloys produced by applying a pulsed current at pulsed current densities of 10.5 and 26.3 mA/cm$^2$ in plating baths having a fixed Ni ion concentration of 2.23 g/l and varying combined concentrations of Fe ions and Co ions within the range of 3.60 to 4.97 g/l.

FIG. 7 shows that the film stresses were smaller for a pulsed current density of 10.5 mA/cm$^2$ than for a pulsed current density of 26.3 mA/cm$^2$. The CoFeNi alloys produced by plating at a pulsed current density of 10.5 mA/cm$^2$ had a concentration ratio Cl/S of about 7.2, and the CoFeNi alloys produced by plating at a pulsed current density of 26.3 mA/cm$^2$ had a concentration ratio Cl/S of about 58. The results also show that variations in film stress can be inhibited irrespective of variations in Fe content for substantially the same concentration ratio Cl/S. In addition, the CoFeNi alloys produced in the experiment of FIG. 7 exhibited high saturation flux densities, namely not less than 2.0 T.

FIGS. 6 and 7 show that lower pulsed current densities result in lower concentration ratios Cl/S and lower film stresses. For substantially the same Fe contents, the CoFeNi alloys in FIG. 6, which had lower metal ion concentrations than the CoFeNi alloys in FIG. 7, had lower film stresses than the CoFeNi alloys in FIG. 7.

The above results prove that the control of the pulsed current density and the metal ion concentration of a plating bath is crucial to adjusting the concentration ratio Cl/S of a CoFeNi alloy within the range of 1 to 60. Light elements such as Cl are incorporated into the resultant plating less easily at a lower metal ion concentration, at which the reduction of metal ions proceeds more easily, and at a lower pulsed current density, which results in a lower deposition rate. This experiment also found that Cl is more responsive to changes in the pulsed current density and metal ion concentration of a plating bath than S, and thus the number of Cl ions incorporated into the CoFeNi alloy varies more largely. For example, the measurements by TOF-SIMS show that the CoFeNi alloy (1) contained 901,565 Cl ions and 20,983 S ions while the CoFeNi alloy (2) contained 1,773,240 Cl ions and 30,620 S ions. These results indicate that the number of Cl ions increased more largely than that of S ions with increasing pulsed current density.

According to the above results, the pulsed current density is preferably about 10 to 27 mA/cm$^2$, and the metal ion concentration of a plating bath is preferably about 1.75 to 5.0 g/l.

Next, the corrosion resistances of the CoFeNi alloys were examined. As a comparative example, the following plating bath was prepared.

[Plating Bath 3]
$FeSO_4 \cdot 7H_2O$: 8.0 g/l
$CoSO_4 \cdot 7H_2O$: 0.5 g/l
$NiSO_4 \cdot 6H_2O$: 15.0 g/l H$_3$BO$_3$: 25 g/l
NaCl: 25 g/l
Saccharin sodium: 1.09 g/l
Sodium lauryl sulfate: 0.01 g/l A CoFeNi alloy was produced by plating in the above plating bath 3 using a pulsed current (Comparative Example 1). The density of the pulsed current was 26.3 mA/cm$^2$.

The CoFeNi alloys (1) to (5) are herein referred to as Examples 1 to 5, respectively. The individual CoFeNi alloys of Examples 1 to 5 and Comparative Example 1 were immersed in physiological saline for 24 hours and were checked for corrosion using a metallurgical microscope. The results are shown in Table 1 below.

TABLE 1

| Sample | Addition of saccharin sodium | Corrosion test results |
|---|---|---|
| CoFeNi (1) (Example 1) | Not added | Not corroded |
| CoFeNi (2) (Example 2) | Not added | Not corroded |
| CoFeNi (3) (Example 3) | Not added | Not corroded |
| CoFeNi (4) (Example 4) | Not added | Not corroded |
| CoFeNi (5) (Example 5) | Not added | Not corroded |
| CoFeNi (Comparative Example 1) | Added | Corroded in not less than 3% of total area |

As shown in Table 1, microscopic observation found the corrosion of not less than 3% of the total area of the CoFeNi alloy of Comparative Example 1. On the other hand, no corrosion was found on the CoFeNi alloys of Examples 1 to 5. The corrosion of the CoFeNi alloy of Comparative Example 1 is due to the addition of saccharin sodium to the plating bath.

The above results prove that CoFeNi alloys having low film stress and excellent corrosion resistance can be produced using a plating bath containing no saccharin sodium and by adjusting the concentration ratio Cl/S within the range of 1 to 60.

What is claimed is:

1. A soft magnetic film mainly containing Fe, Co, and Ni, further containing chlorine (Cl) and sulfur (S) as impurities at a concentration ratio (Cl/S) ranging from 1 to 60.

2. A magnetic head comprising: a main pole layer; a return path layer separated from the main pole layer by a predetermined distance in a thickness direction of the layers on a surface of the magnetic head opposite a recording medium; and a coil layer for supplying a recording magnetic field to the main pole layer and the return path layer, wherein at least one of the main pole layer or the return path layer comprises the soft magnetic film according to claim 1.

3. A magnetic head comprising: a lower core layer; an upper core layer; and a magnetic pole portion disposed therebetween, having a smaller width than the core layers in a track-width direction, the magnetic pole portion including: a lower pole layer continuous with the lower core layer; an upper pole layer continuous with the upper core layer; and a gap layer disposed between the pole layers, or the magnetic pole portion including: an upper pole layer continuous with the upper core layer; and a gap layer disposed between the upper pole layer and the lower core layer, wherein at least one the upper pole layer and/or the lower pole layer comprises the soft magnetic film according to claim 1.

* * * * *

UNITED STATES PATENT AND TRADEMARK OFFICE
CERTIFICATE OF CORRECTION

PATENT NO. : 7,486,477 B2 Page 1 of 1
APPLICATION NO. : 11/339366
DATED : February 3, 2009
INVENTOR(S) : Hisayuki Yazawa et al.

It is certified that error appears in the above-identified patent and that said Letters Patent is hereby corrected as shown below:

Column 10, claim 3, line 27, after "wherein at least one" insert --of--.

Signed and Sealed this

Thirtieth Day of June, 2009

JOHN DOLL
*Acting Director of the United States Patent and Trademark Office*